Oct. 20, 1925.                                                      1,557,848
J. KIRNER
BEARING
Filed June 18, 1923

Inventor
Josef Kirner
by Rogers, Kennedy Campbell
Attys.

Patented Oct. 20, 1925.

1,557,848

UNITED STATES PATENT OFFICE.

JOSEF KIRNER, OF STUTTGART, GERMANY, ASSIGNOR TO THE FIRM: AKTIEBOLAGET SVENSKA KULLAGERFABRIKEN, OF GOTTENBORG, SWEDEN.

BEARING.

Application filed June 18, 1923. Serial No. 645,942.

*To all whom it may concern:*

Be it known that I, JOSEF KIRNER, a citizen of Germany, residing at Stuttgart, Germany, have invented certain new and useful Improvements in Bearings, of which the following is a specification.

My invention relates to bearings and more particularly to rolling bearings which term is intended to comprise roller bearings and ball bearings as distinguished from sliding bearings.

It is an object of my invention to improve the reliability of working and life of rolling bearings of all descriptions by providing means for avoiding certain drawbacks connected with this type of bearing.

Up till now, reliable rolling bearings, more especially for crank pins revolving at a high number of revolutions, did not exist. While in sliding bearings the difficulties to be overcome consist mainly in preventing the bearing from assuming an oblique position relatively to the crank pin, in providing for a satisfactory supply of lubricant, and in avoiding unduly high journal pressure, rolling bearings give rise to new phenomena which are caused by the action of the mass of the rolling bodies (rollers or balls) and the cages which are to a certain degree loosely inserted between the races.

In the drawings affixed to the specification and forming part thereof, the objections connected with rolling bearings are illustrated diagrammatically in Figures 1 and 2, while Figures 3 and 4 disclose, by way of example, different forms of rolling bearings embodying my invention. In the drawings Figure 1 is an elevation of a crank arm, a connecting rod and a crank pin with a rolling bearing inserted between the connecting rod and the crank pin.

Figure 1:
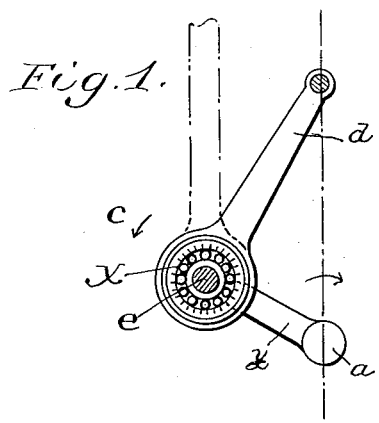

Referring first to Figure 1 of the drawings, $a$ is a crank shaft, $z$ is the crank arm, $e$ is the crank pin, $d$ is the connecting rod and $x$ is the rolling bearing inserted between pin $e$ and rod $d$.

Assuming the axis of crank shaft $a$ to be intersected by the cylinder axis of a motor, the piston of which is pivoted to the connecting rod $d$, the reciprocation of the piston will turn the crank in the direction of the arrow $b$, and the connecting rod $d$ where it is journaled on the crank pin will move relatively to the crank pin in the direction of the arrow $c$ relatively to the crank arm $z$ and crank pin $e$, the direction of this relative motion of the connecting rod being opposed to the direction of movement of the crank pin. However, the velocity at which the connecting rod $d$ rotates relatively to the crank pin $e$ is not constant, but dependent on the length of the connecting rod according to the distance between the centre of the crank pin and the centre of the crank shaft. With a connecting rod of infinite length the rod would rotate relatively to the crank pin $e$ with a constant velocity $n_p^1$, this velocity being equal, but oppositely directed to the velocity of rotation $n_k$ of the crank pin.

Figure 2:
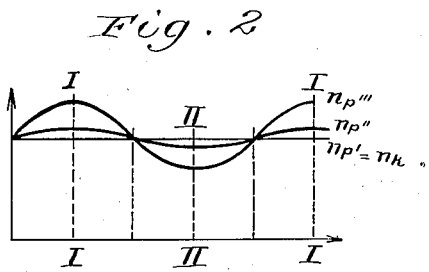
Figure 2 shows a number of time curves illustrating the difference in the speeds of revolution arising in such bearings with connecting rods of different lengths.

As shown in the diagram of Figure 2, the curves resulting with the usual, comparatively short connecting rods differ greatly as compared with the diagram for a connecting rod of an infinite length.

Inasmuch as the curve remains the same under such conditions in which the ratio between the length of the connecting arm and the length of the crank arm is the same, in Figure 2 the numbers of revolutions of the connecting rod relatively to the crank pin are shown for three connecting rods of different relative lengths. The line $n_p^1$ belongs to a connecting rod having a length $\infty : 1$, $n_p''$ refers to a connecting rod $10:1$, and $n_p'''$ refers to a connecting rod of a length $3:1$, in which 1 is the length of the crank arm.

The diagram of Figure 2 shows that the relative velocity of rotation of the crank pin is at its maximum in the upper dead centre position I—I and at its minimum in the lower dead centre position II—II. The diagram further illustrates the important fact that the relative number of rotations of the connecting rod is subject to a twofold change of velocity during each revolution of the crank. In motors of motor cars and the like where it is desirable that the motors be small and compact, the connecting rods are so short that the accelerations and retardations arising in the crank pin bearing are very considerable. These accelerations and retardations are transmitted directly onto the rolling bodies (rollers or balls) and their cages. Moreover, the rotation to which each roller or ball is subjected changes also.

These changes of velocity occur during each revolution of the crank shaft. In an automobile motor running, for instance, with 3600 revolutions per minute and a ratio of connecting rod to crank arm of 3.7, the relative number of rotations of the crank pin bearing varies between 4450 and 2560 revolutions per minute and this variation occurs 60 times per minute. In other words, in one minute the crank pin bearing must be accelerated and retardated, respectively, 60 times from 2560 revolutions to 4450 revolutions per minute and vice versa. The smaller the motor with relation to its output and the higher the number of its revolutions, the more pronounced are the stresses acting on this bearing; for the acceleration rises in proportion to the square of the number of revolutions.

Inasmuch as only a few of the rolling bodies (rollers or balls) are under load at the same moment, the unloaded bodies will not respond to these accelerations and retardations. In consequence thereof, the rolling bodies, on being suddenly brought under load, do not rotate at the number of revolutions which they should have. However, the action of the bearing pressure, causes the rolling bodies to take up their rolling motion suddenly and to vary their velocity with corresponding suddenness. These variations result in a sliding of the rolling bodies which finally leads to fatigue of the surfaces of the races and of the rolling bodies. Additional sliding motion occurs with those rolling bodies which are in the position where the centrifugal force acts tangentially to the pitch circle.

According to the present invention, the objectionable actions above described are obviated by providing means for subjecting the rolling bodies to a permanent auxiliary load. This auxiliary load must not act in an unyielding manner, for, as a rule, the cylinder bore is not disposed exactly vertically to the crank shaft. Therefore, elastic or resilient means are used for creating the auxiliary load.

Figure 3:
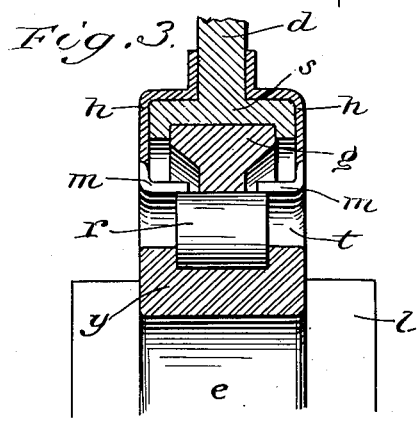
Figure 3 is a cross section of part of a crank pin roller bearing, such as is inserted between the connecting rod and the crank pin of Figure 1, having my invention embodied therein.

Referring now to Figure 3 of the drawings, $y$ is the inner race and $g$ is the outer race of a crank pin roller bearing, $r$ one of the rollers, $d$ the connecting rod, $e$ is the crank pin, and $l$ the crank arms. Two channelled rings or auxiliary races $h$ are applied to the opposite sides of the hub $s$ of the connecting rod and have their inner portions extending axially inwardly towards each other in the form of flanges $t$ so disposed that the outer surface of the flanges will lie substantially flush with the working surfaces of the outer race $g$. These flanges $t$ are subdivided by radial cuts into a great number of resilient members $m$, the inner ends of which rest against the circumference of the rollers $r$ and exert thereon a permanent radial braking or damping pressure acting to keep the rollers sufficiently in contact with the inner race to cause them to roll in the correct manner.

By properly constructing and shaping the rings $h$ they may be caused to act with sufficient resilient pressure on the rollers for the performance of their function, although the pressure surfaces of the rings and the respective surfaces of the rollers may become considerably worn.

Figure 4:
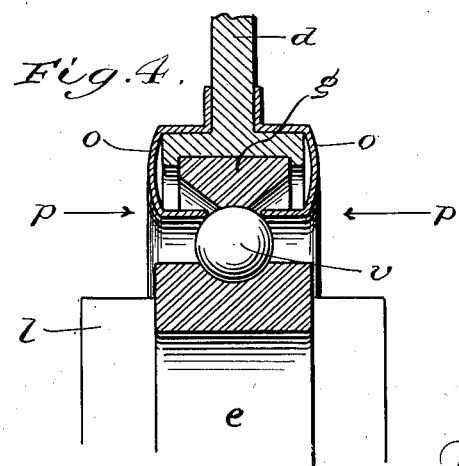
Figure 4 is a similar view of a ball bearing having my invention embodied therein.

In the modification disclosed in Figure 4, showing my invention as applied to a ball bearing, rings $o$ similar to the rings $h$ of Figure 3 are employed for subjecting the balls to an auxiliary damping or braking pressure, the inner flanges of the resilient rings $o$ exerting a resilient radial pressure on the balls $v$ and a pressure in the direction of the arrows $p$. Rolls with conical ends may be substituted for the balls in this bearing.

While I have shown my invention as applied to crank pin bearings, many of its advantages will also be obtained on applying it to bearings for other pins or journals subjected to oscillatory or rotary motion.

I wish it to be understood that I do not desire to be limited to the exact details of construction shown and described, for obvious modifications will occur to a person skilled in the art.

I claim:

1. Bearing comprising in combination, outer and inner main races, a plurality of bodies adapted to roll between and in contact with said races and an auxiliary race applied to the outer main race and arranged to maintain said bodies in permanent contact with the inner main race.

2. Bearing comprising in combination, outer and inner main races, a plurality of bodies adapted to roll between and in contact with said races, and an auxiliary race applied to the outer main race and arranged to maintain said bodies in permanent elastic contact with the inner main race.

3. Bearing comprising in combination, outer and inner main races, a plurality of bodies adapted to roll between and in contact with said races, and a resilient auxiliary race applied to the outer main race and arranged to maintain said bodies in permanent contact with the inner main race.

4. A bearing comprising in combination, two races, a plurality of bodies adapted to roll between and in contact with said races, and rings applied to the opposite sides of one of said races and formed with inwardly extending portions disposed in contact with and arranged to exert elastic pressure on said bodies to press them radially against the other race.

5. A bearing comprising in combination outer and inner races, a plurality of bodies adapted to roll between and in contact with said races, and rings applied to the opposite sides of one of said races and provided with inwardly extending flanges formed with resilient members disposed in engagement with said bodies and acting to press the same onto the other race.

6. In combination with a rotary crank arm provided with a crank pin, an inner bearing race encircling said pin, a connecting rod having fixed to its end an outer bearing race surrounding the inner race, a plurality of rolling bodies between said races adapted to roll in contact with the same, and rings applied to the opposite sides of the outer race and provided with inwardly extending resilient portions engaging the rolling bodies and acting to maintain the same in yielding engagement with the inner race.

In testimony whereof I affix my signature.

JOSEF KIRNER.